(12) United States Patent
Koren et al.

(10) Patent No.: US 12,007,909 B2
(45) Date of Patent: Jun. 11, 2024

(54) ELASTIC RESOURCE MANAGEMENT IN A NETWORK SWITCH

(71) Applicant: XSIGHT LABS LTD., Kiryat Gat (IL)

(72) Inventors: Guy Koren, Rishon Lezion (IL); Gal Malach, Gedera (IL); Carmi Arad, Nofit (IL)

(73) Assignee: XSIGHT LABS LTD., Kiryat Gat (IL)

(*) Notice: Subject to any disclaimer, the term of this patent is extended or adjusted under 35 U.S.C. 154(b) by 0 days.

(21) Appl. No.: 17/300,941

(22) Filed: Dec. 15, 2021

(65) Prior Publication Data

US 2022/0197824 A1 Jun. 23, 2022

Related U.S. Application Data

(60) Provisional application No. 63/199,230, filed on Dec. 15, 2020.

(51) Int. Cl.
*G06F 12/00* (2006.01)
*G06F 12/14* (2006.01)

(52) U.S. Cl.
CPC .... *G06F 12/1408* (2013.01); *G06F 2212/402* (2013.01)

(58) Field of Classification Search
CPC .............. G06F 12/1408; G06F 2212/402
See application file for complete search history.

(56) References Cited

U.S. PATENT DOCUMENTS

| 5,276,825 | A | * | 1/1994 | Blomgren | ............... | G06F 9/324 |
| | | | | | | 712/E9.056 |
| 5,974,518 | A | * | 10/1999 | Nogradi | ................ | H04L 49/90 |
| | | | | | | 709/236 |
| 6,014,727 | A | * | 1/2000 | Creemer | ................... | G06F 5/06 |
| | | | | | | 709/215 |
| 6,356,983 | B1 | * | 3/2002 | Parks | ................. | G06F 12/0817 |
| | | | | | | 711/E12.027 |

(Continued)

OTHER PUBLICATIONS https://web.archive.org/web/20200728010628/https://en.wikipedia.org/wiki/Flat_memory_model (Year: 2019).*

(Continued)

*Primary Examiner* — Shawn X Gu
*Assistant Examiner* — Mohammad S Hasan
(74) *Attorney, Agent, or Firm* — Reches Patents

(57) ABSTRACT

An elastic memory system that may include memory banks, clients that are configured to obtain access requests associated with input addresses; first address converters that are configured to convert the input addresses to intermediate addresses within a linear address space; address scramblers that are configured to convert the intermediate addresses to physical addresses while balancing a load between the memory banks; atomic operation units; an interconnect that is configured to receive modified access requests that are associated with the physical addresses, and send the modified access requests downstream, wherein atomic modified access requests are sent to the atomic operation units; wherein the atomic operations units are configured to execute the atomic modified access requests; wherein the (Continued)

memory banks are configured to respond to the atomic modified access requests and to non-atomic modified access requests.

16 Claims, 5 Drawing Sheets

(56) References Cited

U.S. PATENT DOCUMENTS

| | | | | |
|---|---|---|---|---|
| 8,706,966 | B1* | 4/2014 | Kraipak | G06F 12/084 |
| | | | | 711/119 |
| 8,996,818 | B2* | 3/2015 | Sim | G06F 12/0888 |
| | | | | 711/138 |
| 10,310,995 | B1* | 6/2019 | Malygin | G06F 13/1605 |
| 2004/0008677 | A1* | 1/2004 | Cen | G06F 12/0828 |
| | | | | 711/E12.032 |
| 2004/0073773 | A1* | 4/2004 | Demjanenko | G06F 9/3885 |
| | | | | 712/7 |
| 2005/0144423 | A1* | 6/2005 | Patel | G06F 9/3861 |
| | | | | 711/219 |
| 2011/0066813 | A1* | 3/2011 | Mantor | G06F 9/3824 |
| | | | | 710/52 |
| 2018/0011711 | A1* | 1/2018 | Ray | G06F 12/0806 |
| 2018/0011802 | A1* | 1/2018 | Ndu | G06F 12/0891 |
| 2018/0101480 | A1* | 4/2018 | Abhishek Raja | G06F 12/1027 |
| 2018/0136967 | A1* | 5/2018 | Asbe | G06F 21/53 |
| 2019/0236029 | A1* | 8/2019 | Butcher | G06F 12/0246 |
| 2020/0272779 | A1* | 8/2020 | Boesch | G06F 30/34 |
| 2022/0075737 | A1* | 3/2022 | Itkin | G06F 12/1408 |

OTHER PUBLICATIONS https://web.archive.org/web/20200731232938/https://en.wikipedia.org/wiki/Page_table (Year: 2020).* https://web.archive.org/web/20200728010628/https://en.wikipedia.org/wiki/Flat_memory_model (Year: 2020).*

* cited by examiner

ELASTIC RESOURCE MANAGEMENT IN A NETWORK SWITCH

BACKGROUND

The throughput of network switches grows exponentially while the throughput of memories grows linearly over time. As a result, there is a growing gap between the throughput requirements of network switches and the throughput of the memories the switches use—a phenomena known as "The Memory Wall Problem".

A partial solution to bridging this gap is the use of on-die or on-package integrated memories. These memories are faster than traditional external (off package) DRAMs and SRAMs. However, their cost per bit and area per bit is significantly larger. This forces network switches to integrate less memory per switch throughput (measured in bits/Gbps) and as a result motivates the use of agile memory management schemes in order to optimize the utilization of the memory space for the specific needs of the network users, applications and the switch location in the network.

SUMMARY

There may be provided systems, methods, and computer readable medium as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
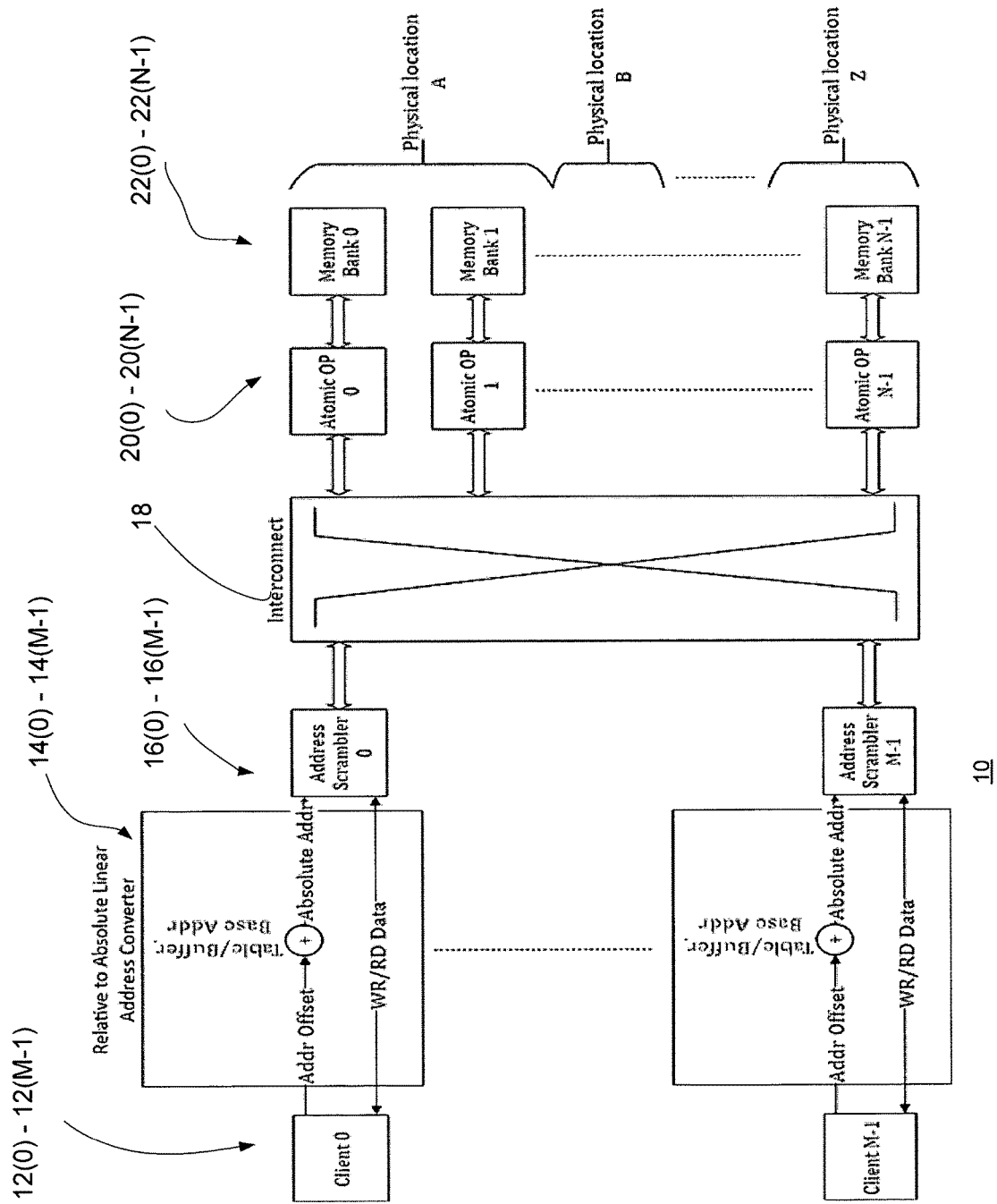
FIGS. 1-4 illustrate examples of systems and their environments.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and should be applied to a non-transitory computer readable medium storing instructions for executing the method.

Any reference in the specification to a system or device should be applied mutatis mutandis to a method that may be executed by the system and to a non-transitory computer readable medium storing instructions executable by the system.

Any reference to a non-transitory computer readable medium should be applied mutatis mutandis to a method for executing instructions stored in the non-transitory computer readable medium and to a system configured to execute instructions stored in the non-transitory computer readable medium.

Any combination of any module or unit listed in any of the figures, any part of the specification and/or any claims may be provided.

Any combinations of systems, units, components, processors, sensors, illustrated in the specification and/or drawings may be provided.

There may be provided methods, systems and a non-transitory computer readable mediums for providing elastic memory management. The elastic memory management may include providing one or more architectures that may be used in many different locations and for multiple applications. The one or more architectures may support multiple memory utilization schemes that may provide a variety of tradeoffs between memory allocated to packet buffering and control tables.

Switch Datapath uses the memories for two main purposes:

Packet Buffering—packet buffering is required because the network endpoints do not coordinate their access to the network. Therefore, congestion might happen and if the frames are not buffered, the switches start dropping packets which in turn require the endpoints to retransmit the lost data. The result of small packet buffers is increased packet lose rate and longer Flow Completion Time (FCT)—phenomena that degrades user experience.

Control tables—the control tables hold the databases required to forward packets, apply security rules, apply Quality of Service (QoS) profiles, and monitor the switch operation. Too little space for control tables may compromise the scale of the network (larger networks typically require larger forwarding tables) and/or its security (e.g. not enough memory to fit all required security rules)

Networks serve many different applications with different requirements from the network. For example, a data center networks might have different needs than a carrier, mobile or an enterprise network. Furthermore, in a particular network, the location of the switch in the network may pose different requirements on the switch. These differences are expressed not only in the total size of the required switch memory but mainly on how the memory is allocated between buffering and control and further among the different control tables.

For example, a data center switch might require less security rules than an enterprise switch (depends on deployment). Furthermore, in a specific network such as a data center network, a ToR (Top of Rack) switch might require larger forwarding tables but less buffering than a Spine or EoR (End of Row) switch.

There may be provided an elastic memory management that support agile tradeoffs between buffer and control space and among the control tables, allows targeting a single switch to different networks and more insertion points in a specific network.

Elastic memory management allows the system vendor to tailor the switch to specific uses thus creating a differentiator from other system vendors that use the same (of the shelf) data-plane switching ASIC.

An example of an elastic memory system that support elastic resource allocation between packet buffers and control tables and among the control tables is depicted in FIG. 1.

It shows M clients (on left) accessing a memory array composed of N banks (on right). A client can be a either an IO port such as network ports writing/reading packets to/from the memory or packet processing engines (that may communicate with an IO port of the memory system) performing queries and or updates to the various (e.g. forwarding/security/QoS/monitoring) databases stored in the memory subsystem. A client may be an IO port of a packet processing engine or an IO port that is in communication with the packet processing engine.

The memory subsystem may be configured to support the following properties:
Presents linear addressing scheme to the clients. That is, the memory appears to the program as a single contiguous address space. Implemented using the interconnect that allows access from every client to every bank and multiple clients to multiple banks at the same time.
Answers the throughput (access rate) requirements by:
  i. Plurality of memory banks operating in parallel.
  ii. Smart address scrambling that evenly load balances the offered load among the memory banks preventing hot spots on specific bank.
Supports atomic operation such as Read-Modify-Write (RMW) or Compare-And-Swap (CAS) using the Atomic Op block put very close to memory banks. The adjacency to the memory bank guarantees that the accessed memory (or memory record) may be locked only for the minimum necessary time.
Order guarantees and unorder operation in per {client, address} granularity. An ordered set of transactions from a specific client to a specific memory address is executed on the memory in the order they were issued by the client. An unordered set of transactions may be executed by the memory in arbitrary order. Unordered transactions may have higher throughput than ordered, depending on the architecture of the interconnect. Ordering is implemented by the interconnect.
Relative addressing: a client may a specific memory entry by specifying the table identifier and an offset to that table. The Relative to Absolute Address Linear Converter translates the offset to an absolute address in the linear address space.
The elastic memory management scheme may exhibit the following:
The interconnect might be implemented in the following methods. In all methods the interconnect is fully reliable in the sense that it doesn't lose transactions:
  i. Closely coupled subsystem where there is a cluster of clients, a cluster of memory banks and a crossbar that interconnects the client cluster to the memory banks cluster. This arrangement typically occupies a subset of the chip die (FIG. 2)
  ii. Loosely coupled subsystem (FIG. 3) where the clients and memory banks are distributed over a chip die and the interconnect is implemented by a Network-On-Chip (NoC). This arrangement typically occupies a significant portion of a single chip die or spans over multiple dies assembled in a single package
  iii. A disaggregated (distributed) system (FIG. 4) where the clients and memory banks are distributed over a large geographical area and the interconnect is realized using a computer network
Address scrambler that takes an address in the linear space and converts is to a physical address composed of {memory bank ID, address offset in the bank}. The scrambler distributes the offered load evenly among the memory banks, thus preventing hot spots on specific banks. A hot spot generated by several clients accessing the same physical memory address is very rare in Switch dataplane devices and may be left for the system designer to solve. For example, the system designer may choose to allocate multiple instances of the same table in the memory and configure the Table Base Addr for each client to access a different table instance. Another option is to cache the memory banks.

FIG. 1 is an example of an elastic memory system 10 that may include (a) memory banks 22(0)-22(N−1), (b) clients (referred to as clients (12(1)-12(M−1)) that may be configured to obtain access requests associated with input addresses, (c) first address converters 12(1)-14(M−1) that may be configured to convert the input addresses to intermediate addresses within a linear address space, (d) address scramblers 16(1)-16(M−1) that may be configured to convert the intermediate addresses to physical addresses while balancing a load between the memory banks, (e) atomic operation units 20(1)-20(N−1), and (f) an interconnect 18 that may be configured to receive modified access requests that may be associated with the physical addresses, and send the modified access requests downstream, wherein atomic modified access requests may be sent to the atomic operation units.

N and M are positive integers. N may equal M. N may differ from M.

The atomic operations units may be configured to execute the atomic modified access requests.

The memory banks may be configured to respond to the atomic modified access requests and to non-atomic modified access requests.

The interconnect may be configured to send the non-atomic modified access requests to the atomic operation units.

A set of access requests of the access requests may be associated with a client and an address range. The interconnect may be configured to (a) determine (for example based on a rule or mapping between {client, address} and ordered or unordered execution}) whether to execute the set of access requests in an ordered manner of an unordered manner based on a combination of the client and the address range, and (b) execute the set of access requests according to the determination.

The elastic memory system may be configured to provide access from each client to each memory bank of the memory banks.

The elastic memory system may be configured to provide access from each client to each accessible entry of each memory bank of the memory banks.

The elastic memory system may be implemented within a single integrated circuit. See for example system 40 of FIG. 2 and system 50 of FIG. 3.

Figure 2:
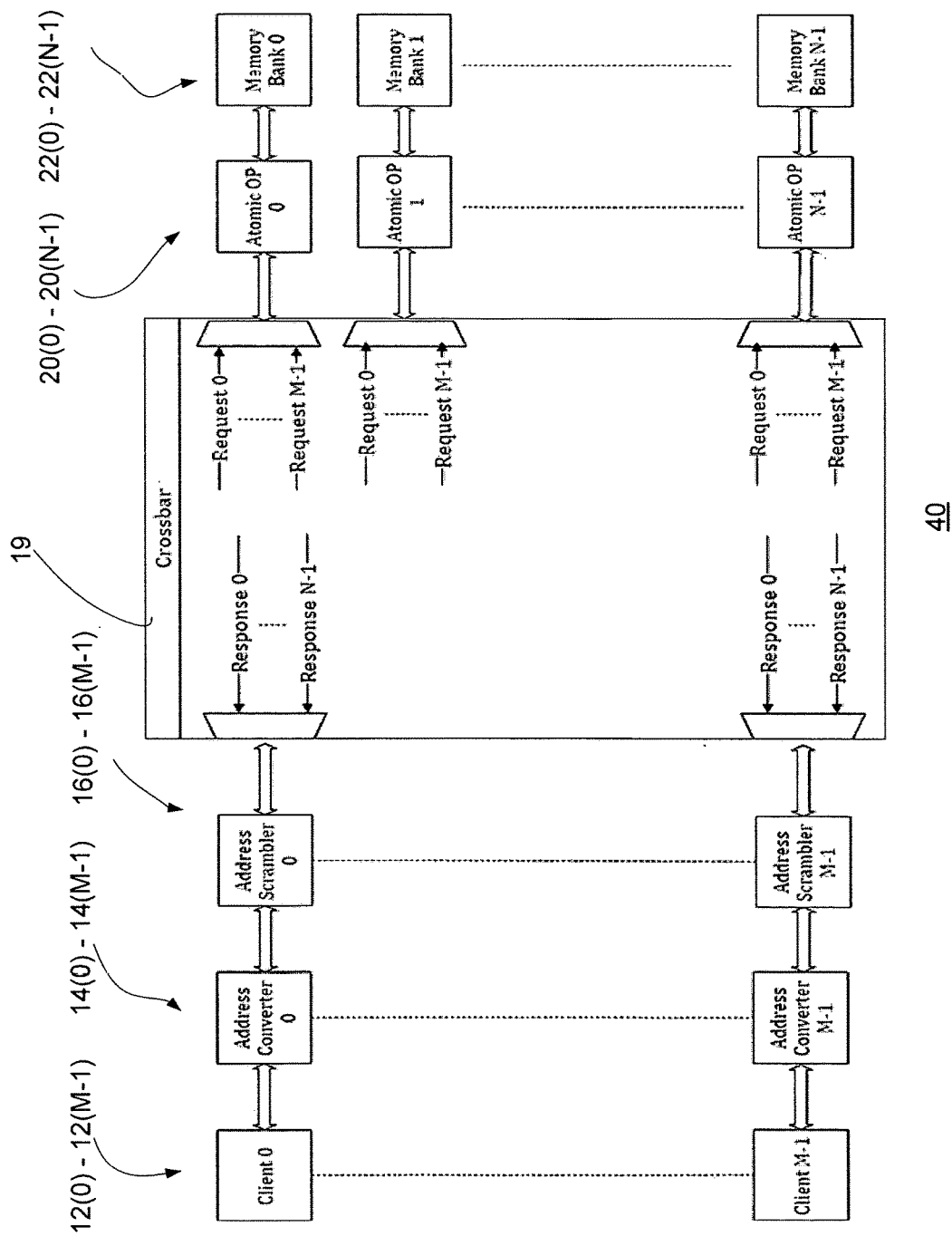

Referring to FIG. 2—the interconnect may be a crossbar 19. The clients 12(0)-12(M−1), the first address converters 14(0)-14(M−1) and the address scramblers 16(0)-16(M−1) may be positioned on one side of the crossbar 19. The memory banks 22(0)-22(N−1) and the atomic operation units 20(0)-20(N−1) may be positioned another side of the crossbar.

Non-atomic modified access request may bypass the atomic operation units via a bypass path between the crossbar and the memory banks.

Figure 3:
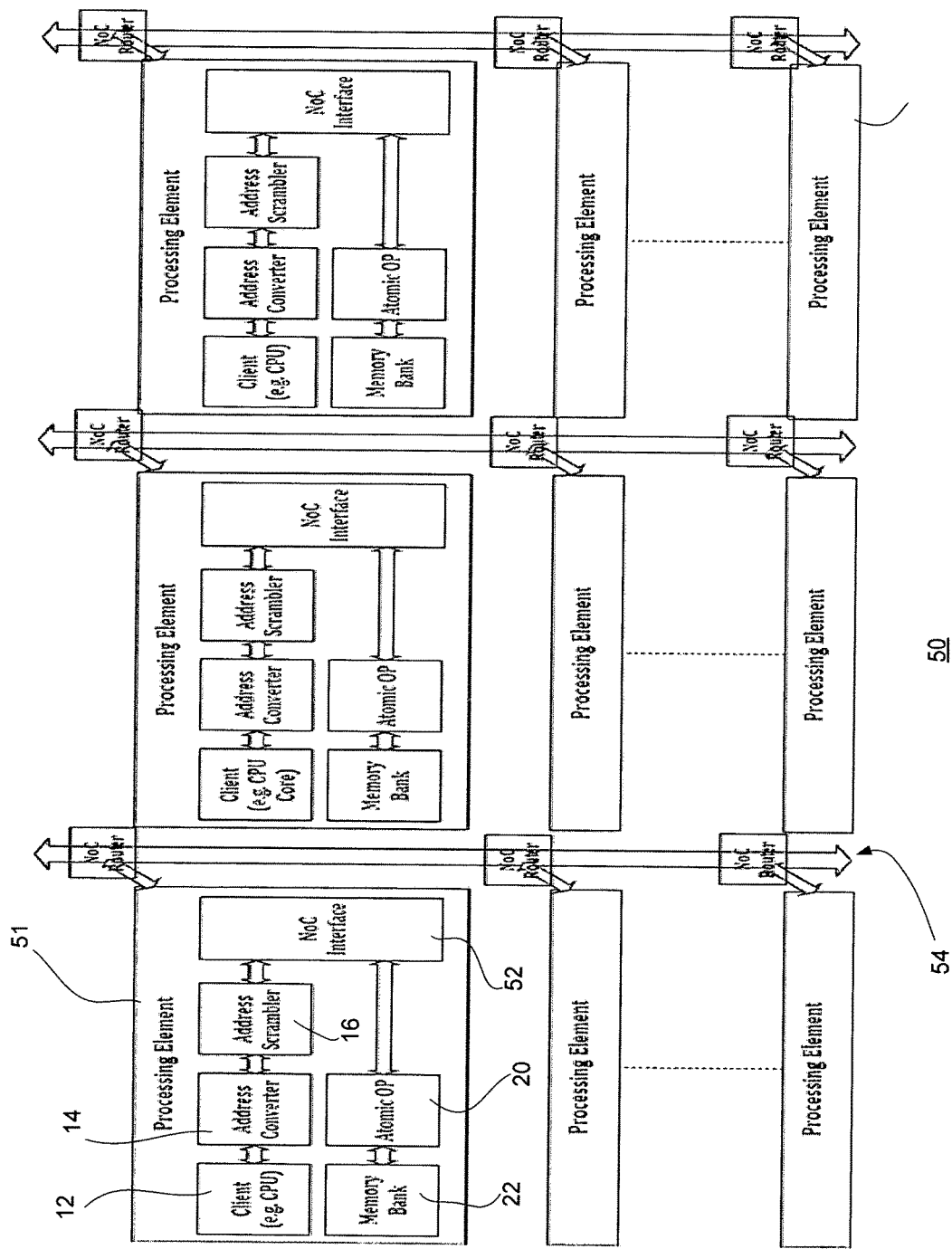

The interconnect may be a network on chip (see NOC 54 of FIG. 3) that may be in communication with multiple processing elements (denoted 51 in FIG. 3) that may include network on chip interfaces (denoted 52 in FIG. 3), the clients (denoted 12 in FIG. 3), the first address converters (denoted 14 in FIG. 3), the address scramblers (denoted 16 in FIG. 3), the atomic operation units (denoted 20 in FIG. 3), and the memory banks (denoted 22 in FIG. 3).

Each processing element may include at least one out of the network on chip interfaces, at least one out of the clients, at least one out of the address converters, at least one of the address scramblers, at least one of the atomic operation units, and at least one of the memory banks. In FIG. 3 there is a single unit per processing element.

The elastic memory system may be distributed between computers. At least two computers may be distant from each other. Distant—distance may exceed 10, 100, 1000, 10,000, 100,000 meters and the like.

Figure 4:
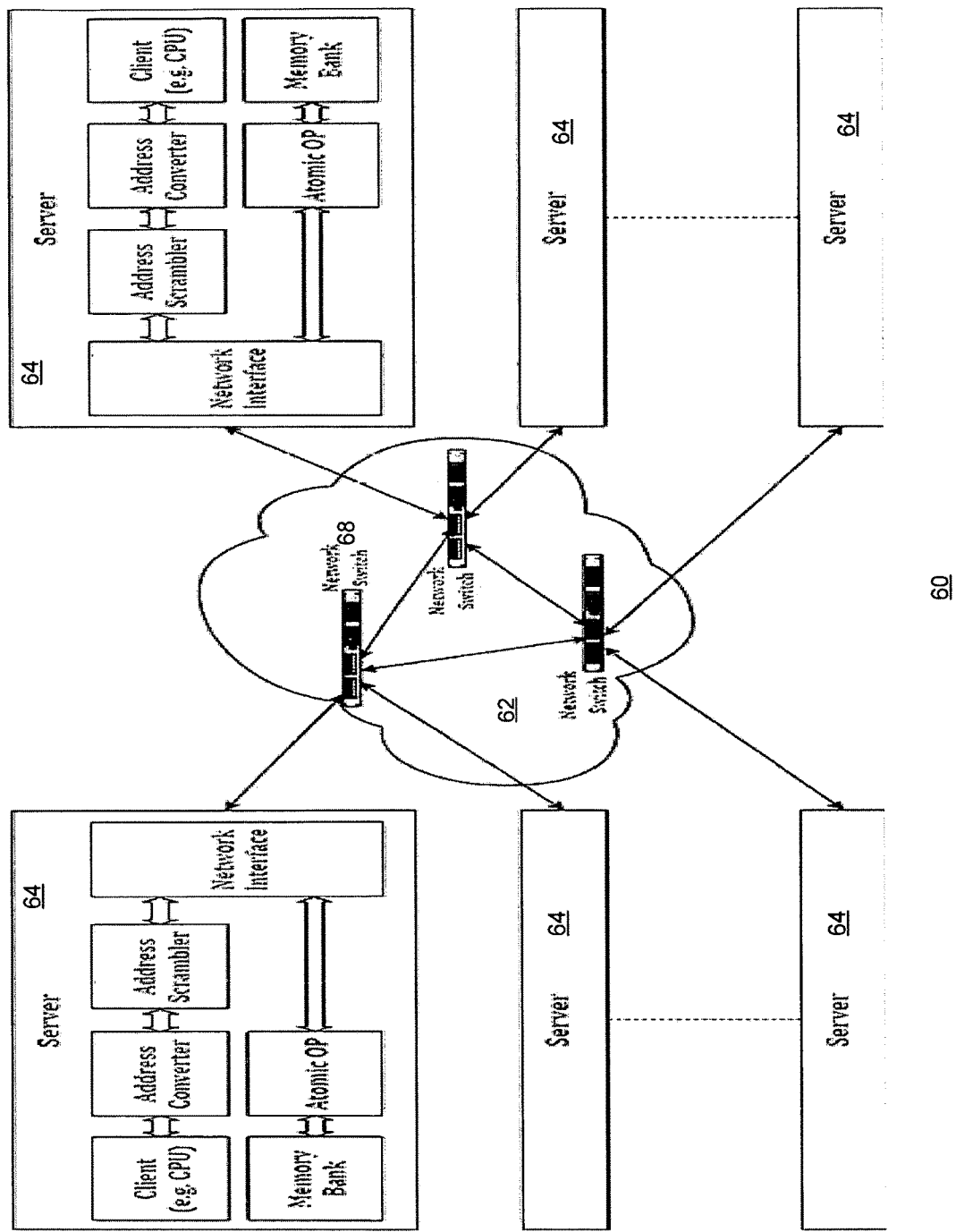

Each one of the computers may include at least one out of the network on chip interfaces, at least one out of the clients, at least one out of the address converters, at least one of the address scramblers, at least one of the atomic operation units, and at least one of the memory banks. In FIG. 4 there is a single unit per computer and the computers are servers 64 that communicate with network 62 that may include network switches 68.

The memory banks may be configured to provide multiple different tradeoffs between buffering resources and management data structure resources. For example, state of the art switching silicon uses 64-512 MegaByte of on die memory for packet buffer and control tables combined.

Figure 5:
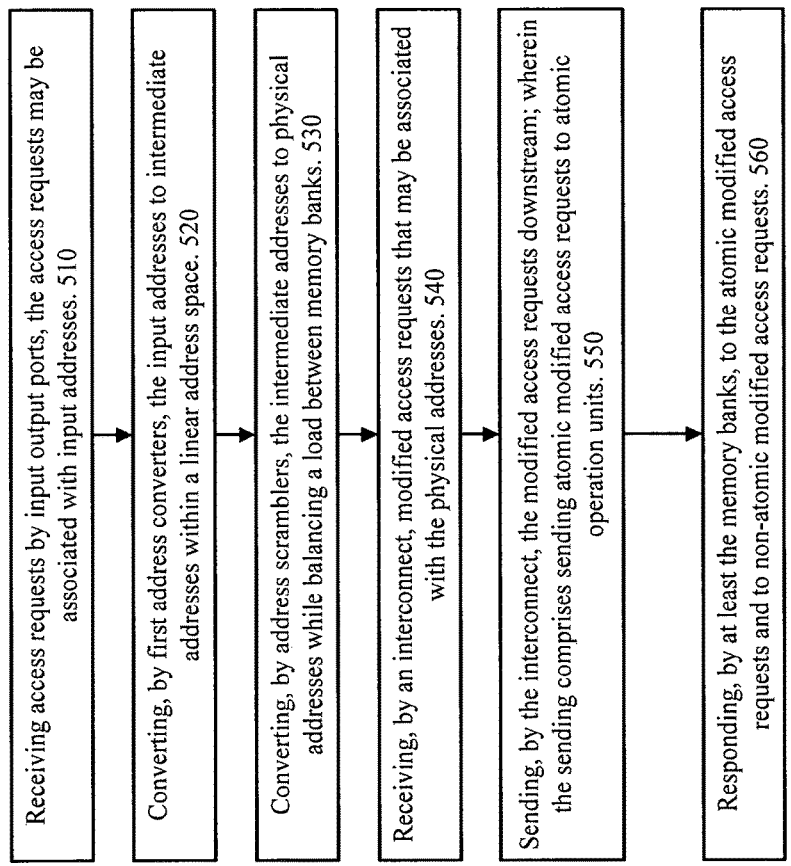
FIG. 5 illustrates an example of a method.

FIG. 5 illustrates an example of method 500 for managing access requests within an elastic memory system.

Method 500 may include (a) step 510 of receiving access requests by clients, the access requests may be associated with input addresses, (b) step 520 of converting, by first address converters, the input addresses to intermediate addresses within a linear address space, (c) step 530 of converting, by address scramblers, the intermediate addresses to physical addresses while balancing a load between memory banks; (d) step 540 of receiving, by an interconnect, modified access requests that may be associated with the physical addresses, (e) step 550 of sending, by the interconnect, the modified access requests downstream; wherein the sending comprises sending atomic modified access requests to atomic operation units, (f) step 560 of executing, by the atomic operations units, the atomic modified access requests, and (g) step 560 of responding, by the memory banks, to the atomic modified access requests and to non-atomic modified access requests.

A response may be conveyed to the interconnect, to an address scrambler (should perform an address descrambling to provide adequate intermediate address—the intermediate address associated to the modified access request), to a first address converters and then to a client. The response is processed to reverse the address conversions and/or scrambling done during the previous steps of the method.

The method may include sending, by the interconnect, the non-atomic modified access requests to the atomic operation units.

The set of access requests of the access requests may be associated with a client and an address range; wherein the method comprises determining by the interconnect, whether to execute the set of access requests in an ordered manner of an unordered manner based on a combination of the client and the address range, and (b) executing the set of access requests according to the determination.

The method may include providing access from each client to each memory bank of the memory banks.

Method 500 may include step 590 of dynamically allocating memory resources to provide different tradeoffs between buffering resources and management data structure resources. The allocation may be dictated by a system administrator, a user, or any authorized entity that may determine which content is to be stored in the memory banks. The content may include data and/or packets and/or management data structure such as routing tables. The dynamic allocation may be translated to write requests for writing content to the memory banks—for example writing control tables, allocation space for control tables, buffering and the like.

There may be provided at least one non-transitory computer readable medium for managing access requests within a system, the at least one non-transitory computer readable medium stores instructions for executing method 500.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. An elastic memory system comprising:
   memory banks;
   clients that are configured to obtain access requests associated with input addresses;
   first address converters that are configured to convert the input addresses to intermediate addresses within a linear address space;
   address scramblers that are configured to convert the intermediate addresses to physical addresses while balancing a load between the memory banks;
   atomic operation units;
   an interconnect that is configured to receive modified access requests that are associated with the physical addresses, and send the modified access requests downstream, wherein atomic modified access requests are sent to the atomic operation units;
   wherein the atomic operations units are configured to execute the atomic modified access requests;
   wherein the memory banks are configured to respond to the atomic modified access requests and to non-atomic modified access requests;
   wherein the elastic memory system is implemented within a single integrated circuit;
   wherein the interconnect is a crossbar;
   wherein the clients, the first address converters and the address scramblers are positioned on one side of the crossbar and the memory banks;
   wherein the memory banks and the atomic operation units are positioned another side of the crossbar;
   wherein the interconnect is configured to send the non-atomic modified access requests to the memory banks through bypass paths between the crossbar and the memory banks, the bypass paths bypass the atomic operation units.

2. The elastic memory system according to claim 1 wherein a set of access requests of the access requests are associated with a client and an address range; wherein the interconnect is configured to (a) determine whether to execute the set of access requests in an ordered manner of an unordered manner based on a combination of the client and the address range, and (b) execute the set of access requests according to the determination.

3. The elastic memory system according to claim 1 that is configured to provide access from each client to each memory bank of the memory banks or to each accessible entry of each memory bank of the memory banks.

4. The elastic memory system according to claim 1 wherein different memory banks store different instances of a same table, wherein the different instances are associated with different ones of the clients.

5. The elastic memory system according to claim 1 wherein the memory banks are configured to provide multiple different tradeoffs between buffering resources and management data structure resources.

6. A method for managing access requests within an elastic memory system, the method comprises:
   receiving access requests by clients, the access requests are associated with input addresses;
   converting, by first address converters, the input addresses to intermediate addresses within a linear address space;
   converting, by address scramblers, the intermediate addresses to physical addresses while balancing a load between memory banks;
   receiving, by an interconnect, modified access requests that are associated with the physical addresses; wherein the elastic memory system is implemented within a single integrated circuit; wherein the interconnect is a crossbar;
   sending, by the interconnect, the modified access requests downstream; wherein the sending comprises sending atomic modified access requests to atomic operation units and sending the non-atomic modified access requests to the memory banks through bypass paths between the crossbar and the memory banks, the bypass paths bypass the atomic operation units;
   executing, by the atomic operations units, the atomic modified access requests; and responding, by the memory banks, to the atomic modified access requests and to non-atomic modified access requests;

wherein the clients, the first address converters and the address scramblers are positioned on one side of the crossbar and the memory banks; and wherein the memory banks and the atomic operation units are positioned another side of the crossbar.

7. The method according to claim 6 wherein a set of access requests of the access requests are associated with a client and an address range; wherein the method comprises determining by the interconnect, whether to execute the set of access requests in an ordered manner of an unordered manner based on a combination of the client and the address range, and (b) executing the set of access requests according to the determination.

8. The method according to claim 6 comprising providing access from each client to each memory bank of the memory banks or to each accessible entry of each memory bank of the memory banks.

9. The method according to claim 6 wherein different memory banks store different instances of a same table, wherein the different instances are associated with different ones of the clients.

10. The method according to claim 6 comprising dynamically allocating memory resources to provide different tradeoffs between buffering resources and management data structure resources.

11. At least one non-transitory computer readable medium for managing access requests within a system, the at least one non-transitory computer readable medium stores instructions for:

receiving access requests by clients, the access requests are associated with input addresses;

converting, by first address converters, the input addresses to intermediate addresses within a linear address space;

converting, by address scramblers, the intermediate addresses to physical addresses while balancing a load between memory banks;

receiving, by an interconnect, modified access requests that are associated with the physical addresses; wherein the elastic memory system is implemented within a single integrated circuit; wherein the interconnect is a crossbar;

sending, by the interconnect, the modified access requests downstream; wherein the sending comprises sending atomic modified access requests to atomic operation units and sending the non-atomic modified access requests to the memory banks through bypass paths between the crossbar and the memory banks, the bypass paths bypass the atomic operation units;

executing, by the atomic operations units, the atomic modified access requests; and responding, by the memory banks, to the atomic modified access requests and to non-atomic modified access requests;

wherein the clients, the first address converters and the address scramblers are positioned on one side of the crossbar and the memory banks; and wherein the memory banks and the atomic operation units are positioned another side of the crossbar.

12. The method according to claim 6, comprising reducing a duration of locking, by an atomic operations unit, of an accessed recorded within a memory bank by minimizing a distance between the memory bank and the atomic operations unit.

13. The method according to claim 6, wherein each atomic operation is associated with a memory bank and is a closest unit to the memory bank.

14. The elastic memory system according to claim 1, that is configured to reduce a duration of locking, by an atomic operations unit, of an accessed recorded within a memory bank by minimizing a distance between the memory bank and the atomic operations unit.

15. The elastic memory system according to claim 1, wherein each atomic operation is associated with a memory bank and is a closest unit to the memory bank.

16. The at least one non-transitory computer readable medium according to claim 11, wherein each atomic operation is associated with a memory bank and is a closest unit to the memory bank.

* * * * *